United States Patent
Beale et al.

(10) Patent No.: US 11,240,818 B2
(45) Date of Patent: Feb. 1, 2022

(54) METHOD AND DEVICE FOR RESOURCE ALLOCATION IN RADIO SYSTEMS WITH FREQUENCY DOMAIN REPETITION

(71) Applicants: SONY MOBILE COMMUNICATIONS INC., Tokyo (JP); SONY CORPORATION, Tokyo (JP)

(72) Inventors: Martin Beale, Weybridge Surrey (GB); Rickard Ljung, Helsingborg (SE); Basuki Priyanto, Lund (SE); Shin Horng Wong, Weybridge Surrey (GB)

(73) Assignee: Sony Group Corporation, Tokyo (JP)

( * ) Notice: Subject to any disclaimer, the term of this patent is extended or adjusted under 35 U.S.C. 154(b) by 219 days.

(21) Appl. No.: 16/483,596

(22) PCT Filed: Jan. 24, 2018

(86) PCT No.: PCT/EP2018/051634
§ 371 (c)(1),
(2) Date: Aug. 5, 2019

(87) PCT Pub. No.: WO2018/141595
PCT Pub. Date: Aug. 9, 2018

(65) Prior Publication Data
US 2020/0022149 A1    Jan. 16, 2020

(30) Foreign Application Priority Data
Feb. 6, 2017   (EP) ..................... 17154897

(51) Int. Cl.
*H04W 72/04*     (2009.01)
*H04W 72/12*     (2009.01)

(52) U.S. Cl.
CPC ..... *H04W 72/0493* (2013.01); *H04W 72/042* (2013.01); *H04W 72/0446* (2013.01);
(Continued)

(58) Field of Classification Search
CPC ........... H04W 72/0493; H04W 72/042; H04W 72/0446; H04W 72/0453; H04W 72/1257;
(Continued)

(56) References Cited

U.S. PATENT DOCUMENTS

2016/0269160 A1*   9/2016   Noh ................. H04L 5/0048
2017/0078830 A1*   3/2017   Wu .................. H04W 4/70
(Continued)

FOREIGN PATENT DOCUMENTS

| WO | 2016/161618 | A1 | 10/2016 | |
| WO | WO-2016161618 | A1 * | 10/2016 | .......... H04W 72/042 |
| WO | 2017/017865 | A1 | 2/2017 | |

OTHER PUBLICATIONS

International Search Report and Written Opinion from corresponding International Patent Application No. PCT/EP2018/051634, dated Apr. 4, 2018, 10 pages.
(Continued)

*Primary Examiner* — Hardikkumar D Patel
(74) *Attorney, Agent, or Firm* — Tucker Ellis LLP (57) ABSTRACT

Method carried out in a radio communications network for communicating with a user equipment, comprising transmitting resource allocation information addressed to the user equipment, wherein said resource allocation information comprises an indication of frequency domain repetition, and wherein said frequency domain repetition is associated with a predetermined mapping of repetitions.

20 Claims, 5 Drawing Sheets

(52) U.S. Cl.
CPC ... *H04W 72/0453* (2013.01); *H04W 72/1257* (2013.01); *H04W 72/1273* (2013.01)

(58) Field of Classification Search
CPC .......... H04W 72/1273; H04W 50/001; H04W 24/10; H04W 76/27; H04W 48/12; H04W 36/00; H04W 56/00; H04W 24/02; H04W 36/0083; H04W 28/18; H04W 72/044; H04W 28/0215; H04W 4/70; H04L 1/1893; H04L 1/1642; H04L 5/0094; H04L 5/0048; H04L 5/0092; H04L 1/08
See application file for complete search history.

(56) References Cited

U.S. PATENT DOCUMENTS

| | | | |
|---|---|---|---|
| 2017/0318487 A1 | 11/2017 | Yamamoto | |
| 2018/0234952 A1* | 8/2018 | Shi | H04L 5/0053 |
| 2018/0310281 A1* | 10/2018 | Takeda | H04L 1/1893 |
| 2019/0254038 A1* | 8/2019 | Zhang | H04L 5/0092 |

OTHER PUBLICATIONS

Qualcomm Incorporated: "Support of larger data channel bandwidth," 3GPP Draft, R1-1611621, Nov. 5, 2016, 6 pages.

Huawei: "Discussion on VoLTE coverage enhancement," 3GPP Draft; R1-1608606, Oct. 9, 2016, 4 pages.

* cited by examiner

METHOD AND DEVICE FOR RESOURCE ALLOCATION IN RADIO SYSTEMS WITH FREQUENCY DOMAIN REPETITION

TECHNICAL FIELD

This disclosure relates to methods and devices for handling resource allocation in radio systems which operate within a grid of time and frequency. More particularly, solutions are provided for allowing communication between a radio communications network for communicating and a user equipment using frequency domain repetition, associated with a predetermined mapping of repetitions.

BACKGROUND

Machine-to-Machine (M2M) communications often refers to technologies that allow devices to communicate with each other, with little human intervention. Such M2M communication devices typically may store data, and may transmit data to other M2M devices or to a server over a network, such as a cellular network.

In the 3rd Generation Partnership Project (3GPP) Long Term Evolution (LTE) and its evolution LTE-Advanced (LTE-A), one version of M2M has been developed under the term Machine Type Communications (MTC). An MTC device may perform automatic data transmissions in a network wherein each data transmission can be initiated by a first machine, routed through a network, and delivered to one or more other machines. When operating under a 3GPP system, such as an LTE system, scheduling of resources for such communication is controlled by the network, typically within the base station, or the eNode B (eNB) as denoted in LTE. In addition to legacy LTE control and data communication and MTC, another system that can co-exist is the in-band deployment of a Narrow-Band Internet of Things (NB-IoT) system. Operating under such a protocol, an NB-IoT carrier of −200 kHz can be located within the assigned bandwidth of LTE operation.

In Release 13 LTE standards both MTC and NB-IoT features include functionalities for coverage enhancements by means of transmission repetitions. This means that a predetermined number of repetitions in time is conducted for each transport block depending on the estimated need for coverage enhancement level, in order to improve the effective link budget. The bandwidth is quite limited for these features, e.g. 1.4 MHz for MTC and 180 kHz for NB-IoT.

Figure 3:
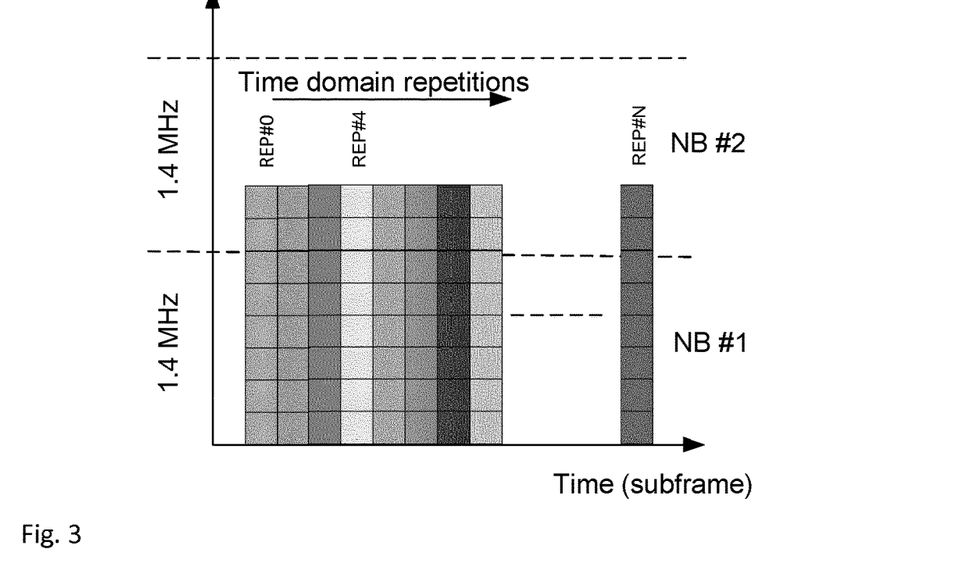
FIG. 3 illustrates an example of mapping of resources using time domain repetitions.

In LTE rel.14, new types of User Equipment (UE) are introduced; an MTC UE with 5 MHz bandwidth, and one may also consider a non-bandwidth limited (non-BL) UE, typically with up to 20 MHz bandwidth, which support coverage enhancements. The main intention is to provide more services (e.g. higher data rates) while still allowing operation in coverage enhancement mode through the use of signal repetitions in the time domain. An example of this is illustrated in FIG. 3, in which a block of data is transmitted in N repetitions in separate consecutive subframes.

When using a number of repeated transmissions in the time domain, the total transmission time increases significantly, which increases the UE power consumption. There could be a need for certain services to minimize latency, e.g. if trying to operate real time services such as voice or video using coverage enhancement with signal repetitions and also to fulfill the requirements of ultra-reliable low latency communications (URLLC) in 5G New Radio (NR).

SUMMARY

Hence there is an opportunity to widen the utilized bandwidth, and at least partly perform the repetitions in the frequency domain. In this manner, the allocated number of physical resource blocks (PRBs) for a transport block can be repeated both in the frequency domain and in the time domain. As an overall concept, repetition in the frequency domain has been initially proposed for further enhancements of the MTC standard in section 4 of 3GPP document R1-1611621, 3GPP TSG RAN WG1 Meeting #87, Reno, Nev., USA, 14-18 Nov. 2016. Based on the overall description of that paper, the methodology of that concept has been further developed by the present inventors, with additional solutions for resource allocation, and how activation/triggering and control signaling for frequency domain repetition operation could be solved for such solutions.

According to one aspect, a method carried out in a radio communications network for communicating with a user equipment is provided, comprising transmitting resource allocation information addressed to the user equipment, wherein said resource allocation information comprises an indication of frequency domain repetition, wherein said frequency domain repetition is associated with a predetermined mapping of repetitions.

In one embodiment, an indication of said predetermined mapping of repetitions is transmitted with said resource allocation information.

In one embodiment, an indication of said predetermined mapping of repetitions is transmitted with higher layer signaling than said resource allocation information. In one embodiment, said predetermined mapping of repetitions is specified as a rule associated with frequency domain repetition.

In one embodiment, said indication of frequency domain repetition includes a one bit field representing a true or false value for allowing communication with frequency domain repetition.

In one embodiment, the method comprises the step of transmitting scheduling information to the user equipment, which scheduling information comprises an indication of radio resource units allocated for transmitting a block of physical data.

In one embodiment, the method comprises the step of transmitting repetition data to the user equipment, wherein said repetition data represents a number of transmission repetitions for said block of physical data.

In one embodiment, said scheduling information comprises an indication of radio resource units for the user equipment to use for a first transmission of said block of physical data, and wherein said predetermined mapping of repetitions determines in which further radio resource units said number of transmission repetitions are scheduled.

In one embodiment, said scheduling data is transmitted responsive to receiving data to transmit from another network element.

In one embodiment, the method comprises the step of receiving a transmission from the user equipment in which said block of physical data is repeated in the frequency domain in accordance with said predetermined mapping of repetitions.

In one embodiment, said predetermined mapping of repetitions involves scheduled repetitive transmission of physical data within radio resource units at different frequencies of a common timeslot, within a resource bandwidth for the user equipment.

In one embodiment, said repetitive transmission is scheduled based on an indication of radio resource units allocated for transmitting a block of physical data.

In one embodiment, an integer number of repetitive transmissions of a whole block of physical data, mapped to a first number of radio resource units, is scheduled within each of one or more timeslots.

In one embodiment, said integer number of repetitive transmissions occupy a majority of the frequency range of the resource bandwidth, and where a complementary range of the resource bandwidth contains a second number of radio resource units, wherein said second number is smaller than said first number.

In one embodiment, said complementary range of the resource bandwidth is unscheduled.

In one embodiment, the radio resource units of said complementary range of the resource bandwidth is unscheduled in each timeslot in which the transmissions are scheduled.

In one embodiment, an integer number of repetitive transmissions of a whole block of physical data, and a first portion of one further transmission of the block of physical data, is scheduled within a first timeslot over the full frequency range of the resource bandwidth, and wherein a second portion of the further transmission the block of physical data is scheduled within a second timeslot.

In one embodiment, said resource bandwidth ranges from a first end, comprising a base radio resource unit, to a second end, comprising a top radio resource unit.

In one embodiment, repetitive transmissions of physical data are first scheduled in a radio resource unit order throughout said resource bandwidth and secondly in consecutive time slot order.

In one embodiment, one transmission of a block of physical data divided over two consecutive timeslots has a first portion scheduled within a first timeslot including the top resource unit, and a second portion within a second timeslot including the base resource unit.

In one embodiment, transmission of one whole block is divided in portions, which portions are mapped to radio resource units of said complementary range of a number of consecutive time slots.

In one embodiment, one repetition of transmission comprises only a portion of a whole block, which portion is mapped to radio resource units of said complementary range a time slot.

In one embodiment, transmission of a block of physical data allocated to N radio resource units, in a resource bandwidth of M radio resource units, is scheduled to a subset S of the resource bandwidth, wherein S is the greatest common divisor of N and M, in consecutive time slots.

In one embodiment, said integer number of transmissions is 1, 2 or more.

In one embodiment, said radio resource unit is a physical resource block PRB, or narrowbands containing a number of resource blocks, of an LTE system.

In one embodiment, said timeslot is subframe of an LTE system.

In one embodiment, said predetermined mapping of repetitions involves repeated transmission of one transport blocks in two or more consecutive time slots.

In one embodiment, the method comprises the step of transmitting data to the user equipment, which data comprises said indication of radio resource units allocated for transmitting a block of physical data.

In one embodiment, said indication of frequency domain repetition is transmitted as downlink control information DCI.

According to a second aspect, a network device for allocating and scheduling of radio resources for communication with a user equipment is provided, comprising a processor; and a computer readable storage medium storing programming for execution by the processor, the programming including instructions to carry out the steps of any of the preceding method steps.

According to a second aspect, a user equipment configured for radio communication with a radio communications network is provided, comprising
a radio receiver for receiving allocation and scheduling information from the radio network;
a processor; and
a computer readable storage medium storing programming for execution by the processor, the programming including instructions which, when executed, configure the radio receiver to retrieve data received in repeated transmissions from the radio network, in which a block of physical data is repeated in the frequency domain in accordance with predetermined mapping of repetitions according to the steps of any of the preceding method steps.

BRIEF DESCRIPTION OF THE DRAWINGS

The invention will be described in detail below with reference made to the appended drawings, in which.

DESCRIPTION OF EMBODIMENTS

In the following, the detailed description describes example embodiments of the present invention in relation to broadband wireless wide area networks, but it may be noted that the invention is not limited thereto and can be applied to other types of wireless networks where similar advantages can be obtained. Furthermore, description will be given primarily of embodiments related to MTC under LTE, but the invention is applicable also to other types of radio systems where scheduling may be provided in the frequency domain, and may also include coming systems such as discussed under the concept of NR (New Radio).

Figure 1:
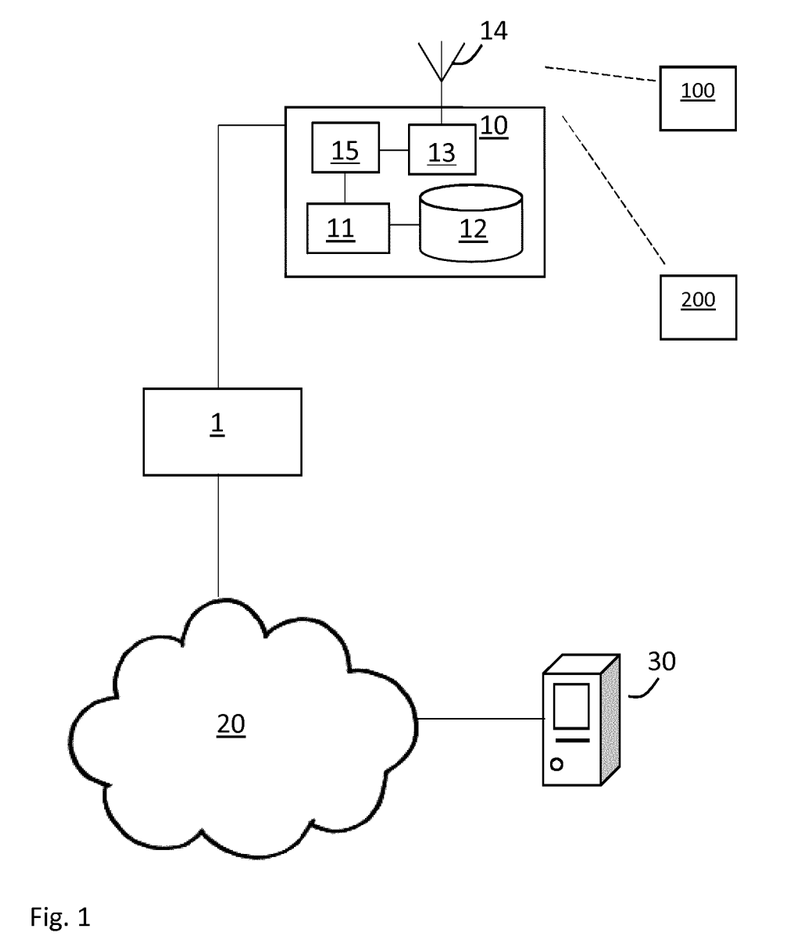
FIG. 1 schematically illustrates devices in a radio communications network.

FIG. 1 illustrates, on a schematic level, a radio communications system in which an embodiment of the invention may be realized. The radio communications system may include a core network 1, which in turn may be connected to other networks 20 including the Internet. For the purpose of providing wireless radio communication, the system may include a radio base station 10, which may be connected to the core network 1. In one embodiment, the base station 10 may provide radio access within a dedicated area, within which radio devices 100, 200 configured to operate in the radio communications system may be connected to the base station 10. The radio communications system may be cellular, and is mainly referred to herein in the example of LTE, in which the base station 10 may be an eNB.

A base station 10 may take several different forms and incorporate different functions. As exemplified in the drawings, though, a base station 10 may comprise a controller 11 including a processor. A data storage device 12 including a computer readable storage medium is further included, storing programming for execution by the processor of the controller 11. As is known in the art, certain program code or applications may also reside in other entities, accessible as cloud-based through the core network 1. The base station 10 further comprises or is connected to a radio transceiver member 13, which in turn is connected to an antenna 14. A connection interface (not shown) for wire-bound communication with the core network 1 may also be included. The base station 10 may also comprise a scheduler 15, which as such may be realized by execution of code and program instructions by the controller 11, although the scheduler is represented by a functional block in the drawing.

Devices 100, 200 may communicate with each other or with other devices, such as a network server 30, through or at least under the control of the radio base station 10. In a direct communication D2D, resources may be scheduled or otherwise controlled by the base station 10, whereas communication may be carried out directly between adjacent devices 100, 200 over radio. In another embodiment, communication between devices 100, 200 will, even when they are close enough to detect each other, normally be carried out through radio communications network including the base station 10.

Figure 2:
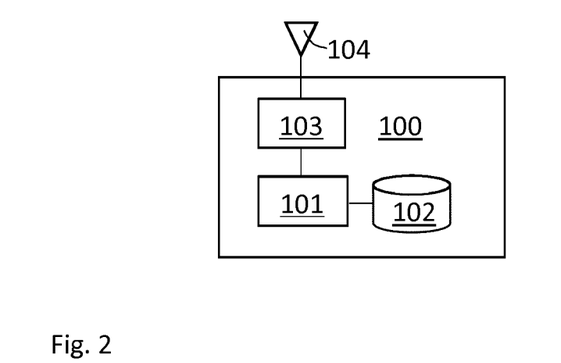
FIG. 2 schematically illustrates components of a communication device for operating in a system of FIG. 1.

FIG. 2 discloses a block diagram of certain elements forming part of a communications device 100. As for the base station 10, the communications device may take several different forms and incorporate different functions. As exemplified in FIG. 2, a communications device 100 may comprise a controller 101 including one or more processors. A data storage device 102 including a computer readable storage medium is further included, storing programming for execution by processors of the controller 101. Additional software programs or code may reside in other entities, accessible as cloud-based through the core network 1. Device 100 further comprises a radio transceiver member 103, which in turn is connected to an antenna 104. As will be readily understood by the skilled reader, the communications device may comprise a number of other features and functions, such as a user interface, a power supply etc., but such features are left out of the drawings since they do not add to the understanding of the invention and its benefits. Communication devices 100, 200 configured to communicate in the communications system may e.g. be mobile phones, tablets, computers, wearables etc., configured to relay speech communication, images, streaming data, data for download etc. In addition, devices 100 may also be configured to communicate at low data rate and/or with long cycles of inactivity between transmissions, such as utility gauges, sensors, measuring and monitoring devices and so on, targeted by systems such as MTC and NB-IoT.

The present invention relates to methods of resource allocation and signaling to utilize wider bandwidth for frequency domain repetition and thus, reduce latency and/or power consumption, and in various embodiments this may be carried out by entities of FIGS. 1 and 2. The rationale is that frequency domain repetition reduces the amount of time required for the UE to receive or transmit a repetitive packet. This reduces power consumption by allowing the UE to more quickly receive data and hence more quickly return to a lower power state. As an example, a packet or block of data may require 4 repetitions to obtain the required coverage enhancement, and if this is performed in the legacy method as in the example of FIG. 3, this would take four subframes. However, by utilizing resources in the frequency domain, the repetition may be completed within fewer subframes, such as three, two or 1, dependent on the size of the allocated resource bandwidth for the user equipment and the amount of data to be sent. It should thus be appreciated that for larger number of repetitions, the total time spent on these repetitions can be significantly reduced by utilizing frequency domain repetition. As an example, if 100 repetitions are required and if 4 repetitions can be fitted into a narrowband assigned as resource bandwidth for the user equipment, then the time spent on this repetition is reduced by a factor of 4. The resource bandwidth allocated to the UE may range from a first end, comprising a base radio resource unit, to a second end, comprising a top radio resource unit. Separate signaling from the network to a UE may be employed to indicate the maximum bandwidth that may be used for frequency domain repetition, and this bandwidth may in one embodiment be smaller than the full allocated resource bandwidth for that UE.

When using the concept of repetition in frequency domain, the method of determining how to allocate the transmission into frequency and time needs to be defined, which is referred to herein as resource mapping. A set of different mapping schemes will be described, for predetermined mapping in the frequency domain and in the time domain. Examples of such predetermined mapping in the frequency domain will be provided with reference to FIGS. 4-8. First, however, a general presentation of the invention and various embodiments will be provided, at which only brief reference to the drawings is made.

The overall invention relates to a method carried out in a radio communications network for communicating with a user equipment. The radio communications network may include a radio core network 1 and one or more base stations 10. The method may be carried out in the network, e.g. by means of a scheduler 15 or other entity, which as such may be realized by execution of code and program instructions by a controller 11. The method may comprise the steps of transmitting resource allocation information addressed to a user equipment, e.g. user equipment 100, wherein said resource allocation information comprises an indication of frequency domain repetition, which frequency domain repetition is associated with a predetermined mapping of repetitions.

The method as described herein is preferably triggered by downlink (DL) data arriving at the base station from the core network, to be transmitted to the UE. Resource allocation in terms of bandwidth and even scheduling information comprising an indication of radio resource units, may typically be transmitted to the UE, responsive to receipt of data arriving from the core network, as will be outlined with examples below. This may also include an indication of a block of physical data, arriving in the base station from the core network, which is to be transmitted to the UE.

In an alternative or additional embodiment, the method may involve or be triggered by receipt in the radio communications network of a scheduling request from a UE. This scheduling request may include an indication of a block of physical data the UE intends to transmit. This may e.g. be accomplished by means of a Buffer Status Report from the UE. Resource allocation in terms of bandwidth and even scheduling information comprising an indication of radio resource units, may typically be transmitted back to the UE.

In one embodiment, the indication of frequency domain repetition may include a one bit field transmitted from the radio communications network to the UE, representing a true or false value for allowing communication with frequency domain repetition. In a preferred embodiment, the indication of frequency domain repetition may be signaled via DCI (Downlink Control Information) of e.g. an LTE system, whereby the UE will be configured to utilize frequency domain repetition. In one embodiment, a new field in the DCI can be used to indicate whether the UE communication shall be carried out using frequency domain.

When it is established that communication between the base station 10 and the UE 100 may or shall be carried out with frequency domain repetition, a predetermined frequency repetition mapping may be applied. With reference to the drawings, several different embodiments of frequency domain repetition will be described according to respective associated predetermined mapping of repetitions. In one embodiment, an indication of said predetermined mapping of repetitions is transmitted with said resource allocation information, dedicated to a particular UE or UEs. This way, the specific predetermined mapping of repetition may be dynamically changed by the base station, and the UE may be updated accordingly of the mapping employed for the data transmitted to the UE. In another embodiment, an indication of said predetermined mapping of repetitions may be transmitted with higher layer signaling than said resource allocation information, such as in a System Information Block SIB and/or Radio Resource Control (RRC) signaling.

In one embodiment, the predetermined mapping of repetitions may be specified as a rule associated with frequency domain repetition, such as in a 3GPP technical specification. This way, the indication of frequency domain repetition, possibly together with other downlink information, may inherently also identify the predetermined mapping of repetitions in frequency, and possibly also time, which may be deduced by the UE.

In one embodiment, a base station 10 of the radio communications network may be configured to transmit scheduling information to the UE 100, which scheduling information comprises an indication of radio resource units allocated for transmitting a block of physical data. In one embodiment, said indication of radio resource units may include an indication of radio frequency units. More specifically, the indication may include a number of radio frequency units assigned for transmission to the UE in the DL. Said indication of radio frequency units may e.g. include a first radio frequency unit of a contiguous range of radio frequency units.

In one embodiment, the indication of radio resource units may comprise an indication of Physical Resource Blocks (PRB) in an LTE implementation. The resource allocation information for downlink transmission may e.g. indicate to a scheduled UE a set of contiguously allocated virtual resource block indices. A resource allocation field in the scheduling grant may comprise a resource indication value RIV corresponding to a starting resource block and a length in terms of contiguously allocated resource blocks. Other ways of downlink resource allocation may be used, though.

As noted, the scheduling information may in various embodiments comprise an indication of radio resource units for the user equipment to use for a first transmission of said block of physical data. As an example, a first transmission of a block of data, which may also be noted Repetition 0 (REP0), may thus be scheduled to start with a first radio resource unit and further occupy a contiguous number of subsequent radio resource units. Furthermore, the predetermined mapping of repetitions may control in which further radio resource units said number of transmission repetitions are scheduled, if frequency domain repetition is active, as will be outlined for various different embodiments. In one type of embodiment, a next subsequent transmission (REP1) may be configured, by the predetermined mapping of repetitions, to commence with a radio resource unit immediately following a last radio resource unit of REP0, in the same timeslot, e.g. subframe. In such an embodiment, transmission of one block of data will thus be followed by repeated transmission of that block of data, starting immediately after the preceding transmission and in the same timeslot. So, in various embodiments, the repetitive transmission may be scheduled based on an indication of radio resource units allocated for transmitting a block of physical data. In other words, only the first transmission, e.g. REP0, may be scheduled to one or more PRBs, and the PRBs used for the repetitions will then follow a rule or scheme related to the particular predetermined mapping of repetitions.

In various embodiments, an integer number of repetitive transmissions of a whole block of physical data, mapped to a first number of radio resource units, may be scheduled within each of one or more timeslots. This means that 1, 2 or more transmission repetitions may be carried out in a first timeslot by means of mapping in the frequency domain, as exemplified in the drawings. The transmission repetitions of one timeslot may be mapped to make use of all radio resource units within the allocated bandwidth, such as in FIGS. 4 and 6-8. The integer number of repetitive transmissions preferably occupies a majority of the frequency range R1 of the resource bandwidth for the UE, where a complementary range R2 of the resource bandwidth contains a second number of radio resource units which is smaller than said first number. This is exemplified in the embodiments described with reference to FIGS. 5-7.

Figure 5A:
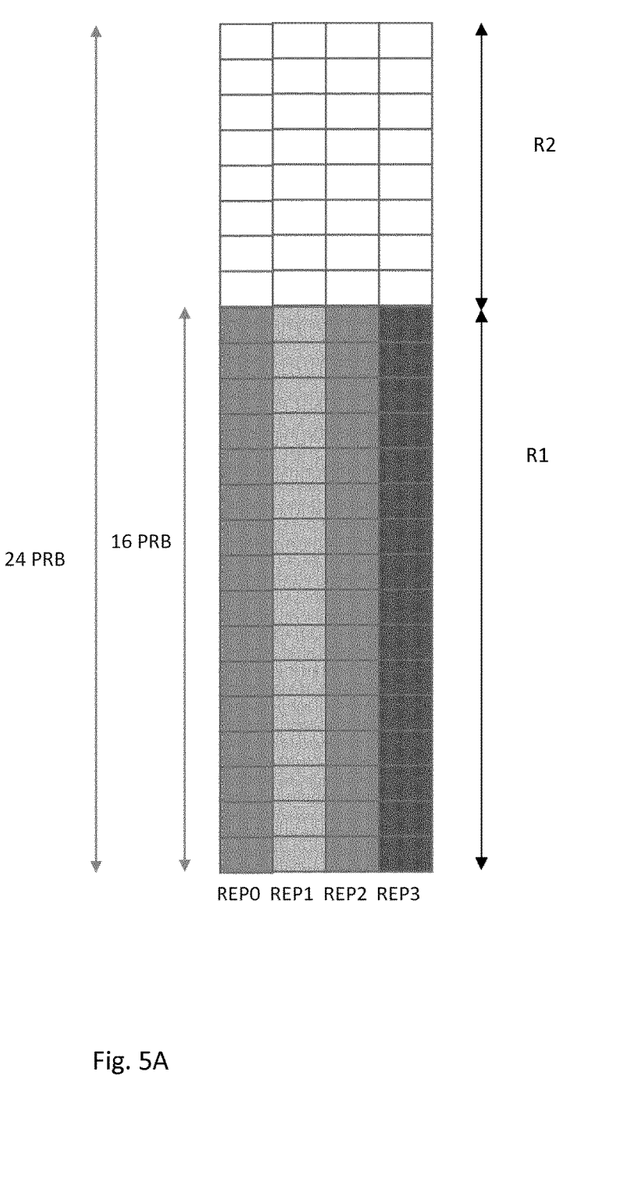
FIGS. 5A and 5B illustrates another embodiment of scheduling using frequency domain repetitions, where a part of the available bandwidth is unassigned.
Figure 5B:
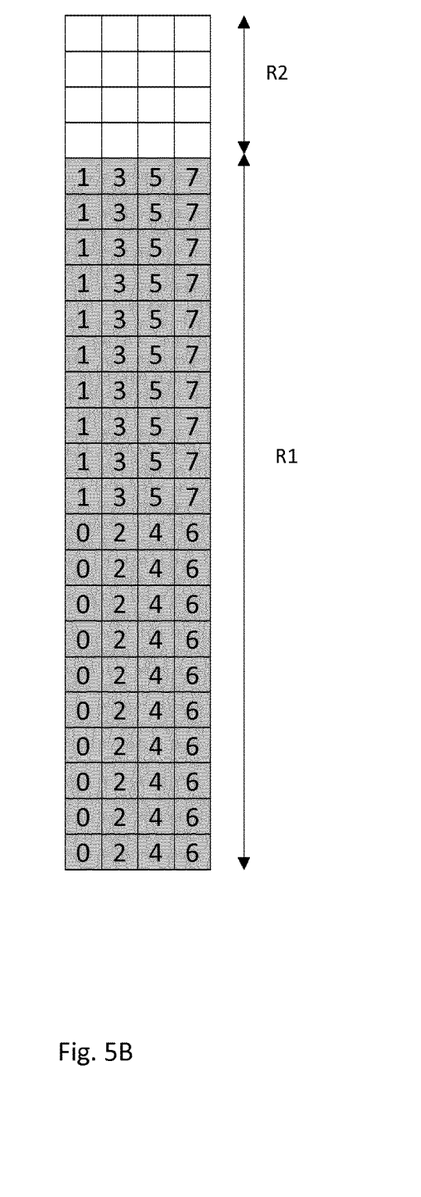

In one embodiment, the radio resource units of the complementary range of the resource bandwidth is unscheduled in each timeslot in which the transmissions are scheduled, as in FIGS. 5A and 5B. In such an embodiment, a transmission may be configured, by the predetermined mapping of repetitions, to commence with the first radio resource unit in a subsequent timeslot, if a remaining number of radio resource units in a transmission bandwidth allocated to the UE is less than the number of radio resource units allocated for transmission of one whole block of data.

Figure 6:
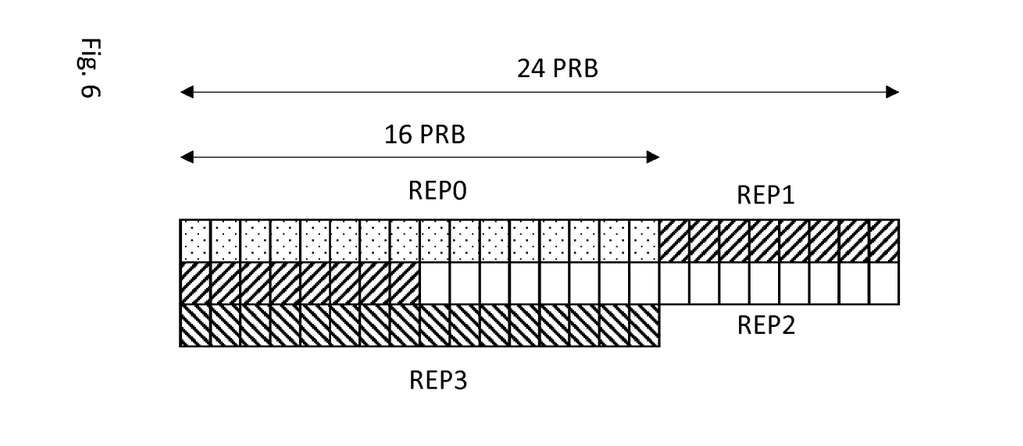
FIG. 6 illustrates an embodiment of scheduling using frequency domain repetitions to evenly fill out the available bandwidth in a timeslot, by means of first mapping according to frequency, and subsequently according to time.
Figure 7:
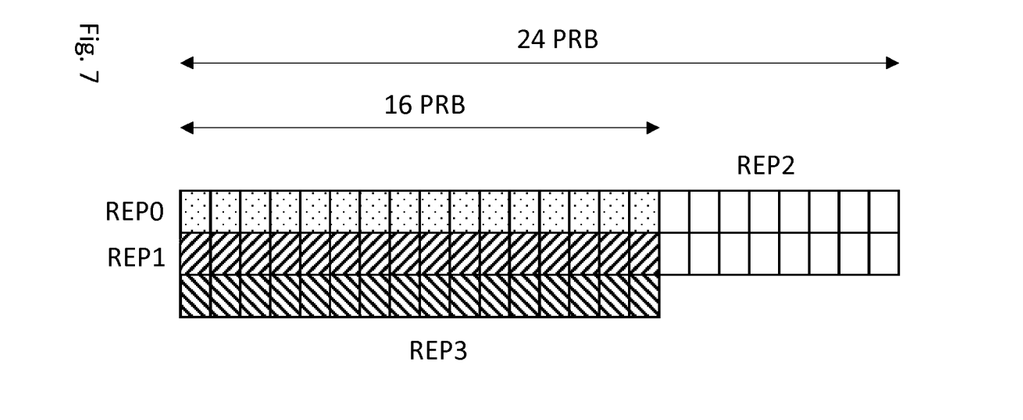
FIG. 7 illustrates an embodiment of scheduling using frequency domain repetitions to evenly fill out the available bandwidth in a timeslot, by means of combining mapping according to frequency and time.

In an alternative embodiment, the complementary range is used for a partial transmission, as in FIGS. 6 and 7. In such an embodiment, an integer number of repetitive transmissions of a whole block of physical data, and a first portion of one further transmission the block of physical data, is scheduled within a first timeslot over the full frequency range of the resource bandwidth. Furthermore, a second portion of the further transmission the block of physical data may be scheduled within a second timeslot, preferably immediately subsequent to the first timeslot.

Preferably, repetitive transmissions of physical data are first scheduled in a radio resource unit order throughout the resource bandwidth and secondly in consecutive time slot order. One transmission of a block of physical data, which is divided over two consecutive timeslots, may comprise a first portion scheduled within a first timeslot including a top resource unit, and a second portion within a second timeslot including the base resource unit, as in the example of FIG. 6.

As mentioned, in various embodiments an integer number of repetitive transmissions occupy a majority of the frequency range of the resource bandwidth, where a complementary range of the resource bandwidth contains a second number of radio resource units which is smaller than the first number. In some embodiments, transmission of one whole block may be divided in portions, which portions are mapped to radio resource units of the complementary range of a number of consecutive time slots. In such an embodiment, repetition may thus first be mapped in the frequency domain so as to fit as many whole blocks of data within a first timeslot, secondly to fit further repetitive transmission in a corresponding manner in a subsequent timeslot. This may be repeated until the sum of the number of resource units in the complementary range of the consecutive timeslots are equal to or more than one whole block of data. One block of data may thus be divided to two or more portions and scheduled into said complementary range of the otherwise filled up timeslots. An example of such a mapping is shown in FIG. 7. Another embodiment is described with reference to FIG. 8, which shows an example of a method in which transmission of a block of physical data allocated to N radio resource units, in a resource bandwidth of M radio resource units, is scheduled to a subset S of the resource bandwidth, wherein S is the greatest common divisor of N and M, in consecutive time slots.

Some examples of embodiments will now be described with reference to the drawings. It may be noted that the present invention revolves around the notion of frequency domain repetition, which may also be combined with time domain repetition. While it makes more sense to talk about first and second, or preceding and subsequent, repetitive transmissions in the time domain, the corresponding terms are used also for explaining embodiments of mapping in the frequency domain. In such embodiments, this may refer to an order of radio resource units, such as PRBs, which may range from a first end of a resource bandwidth, comprising a base radio resource unit, to a second end comprising a top radio resource unit. Furthermore, it may be noted that since this is a matter of scheduling of repetitions, each transmission of a block of data contains the same information, even if it is sent in different PRBs, or even if it is sent using different redundancy versions. The numbering #1, #2 etc, need therefore have no real meaning in these drawings, other than indicating how many repetitions have thus far been scheduled.

Figure 4:
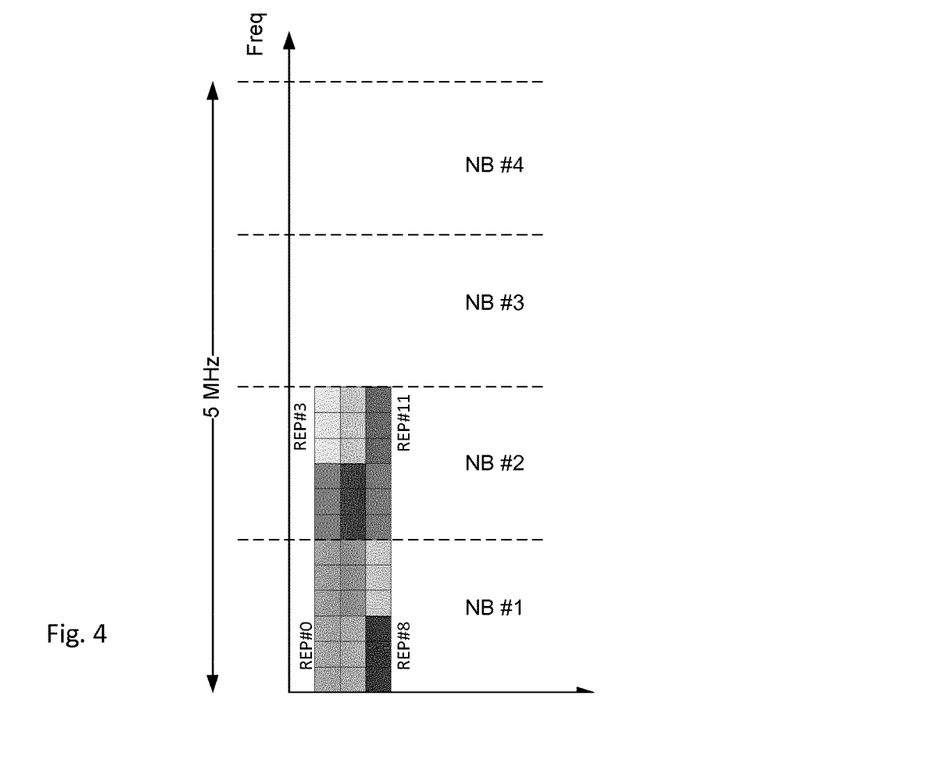
FIG. 4 illustrates an embodiment of scheduling using frequency domain repetitions to evenly fill out the available bandwidth in a timeslot.

FIG. 4 illustrates an embodiment of a predetermined mapping of repetitions in the frequency domain. The UE may be allocated the number of PRB(s) that the the base station uses to transmit one transport block, e.g. X PRBs. The eNB may also allocate the possible transmission bandwidth, e.g. Y PRBs. This transmission bandwidth can e.g. be a multiple of a number of narrowbands, to simplify signaling, and the transmission bandwidth is less than or equal to the bandwidth supported by the UE, e.g. Z PRBs. Basically there may be a relationship: $X<Y \leq Z$.

In MTC Release 13 (also known as e-MTC), there are 6 PRBs per narrowband in the frequency domain, corresponding to 1.4 MHz. In the time domain, a PRB consists of 7 OFDM symbols (OFDM with normal CP length configuration). A PRB-pair spans a subframe in the time domain. In eMTC Release 14 (also known as fe-MTC), the maximum bandwidth supported by the UEs is 24 PRBs, or 4 narrowbands. This is approximately 5 MHz.

In the example of FIG. 4, the number of PRBs used to carry one transport block is 3 (X=3), and the allocated transmission is 2 narrowbands (Y=2*6=12 PRBs). Furthermore, the number of repetitions, or more correctly the number of repetitive transmissions, is 12. In such a scenario, the resource allocation can be as shown in FIG. 4. Since the allocated bandwidth is evenly divided by the number of radio resource units, i.e. PRBs, per transport block, the full allocated bandwidth may be used. 12 repetitive transmissions may thus be carried out within only 3 timeslots, i.e. subframes. A benefit of this embodiment is that each repetition (transport block) is always contained within one subframe. The number of frequency domain repetitions may also be configured to be equally distributed across the subframes. This embodiment may e.g. be suitable for small transport block sizes.

FIGS. 5A and B both illustrate another type of embodiment. Repetitions where the number of PRBs in a UE allocation is relatively large, compared to the bandwidth capability of the device are hard to map to physical resources. FIG. 5A shows a case where a repetition of a transport block is mapped to 16 PRBs and the bandwidth capability or allocation of the device is 24 PRBs. In this case, the 16 PRBs occupied by a repetition of a transport block is relatively large (i.e. 67% of) compared to the usable bandwidth. The eNB is unable to fully allocate the PRB capability of the UE, in an embodiment where it is only possible to allocate an integer number of repetitions within the resource bandwidth of the UE, since 1.5 repetitions would be required to fully allocate the bandwidth capability of the device in a subframe. Hence in FIG. 5A, the eNB allocates only 16 PRBs per subframe to the UE, where the unallocated PRBs at the top are shown as empty white squares.

In FIG. 5B, though, a transport block is mapped to only 10 PRBs. This means that an integer of 2 transport blocks may be transmitted in the same subframe. This will occupy 20 PRBs, since one repetition REP #X is preferably followed immediately by the subsequent repetition REP #X+1 in the next PRB. In this drawing, the repetition number 0-7 for REP #0=REP #7 of the transport block is marked in the squares, which each correspond to one PRB. So, also in this embodiment there will be a complementary part, marked by white squares, which cannot be mapped to a whole transport block per subframe.

The embodiments of FIGS. 5A-B are similar to that of FIG. 4, with the difference that the resource allocation and the predetermined mapping of repetitions is not carried out such that the bandwidth resource allocated to the UE can be evenly divided with the size of the transport block to transmit. Instead, some resources in the upper frequency part may be left empty, and it is preferably up to the eNB to utilize that resource part, allocate that part for another UE, or keep it empty.

FIG. 6 shows yet another embodiment. When the number of PRBs assigned to the UE per repetition is relatively large, compared to the overall number of PRBs assigned to the UE in the frequency domain, the PRBs assigned to the repetitions may be mapped to physical resources such that the allocated bandwidth is optimally used, as shown in the drawing. This figure shows that the PRBs of a certain repetitive transmission REP #X are mapped directly after those of the preceding repetitive transmission REP #X−1 in the frequency domain. As an example, a first repetitive transmission REP0 in the first subframe is immediately followed (in frequency order) by a first portion of a second repetitive transmission REP1 in the same subframe. The remaining portion of the second repetitive transmission is then mapped starting from the base PRB of the second subframe.

A benefit of this type of predetermined mapping is that the repetitions adaptively follow the available resources in frequency and time. This ensures that all resources are fully utilized. There is a possibility that one repetition is split in two subframes, and that the receiver then needs to buffer that repetition.

FIG. 7 illustrates another embodiment of mapping, where whole repetitions are mapped in the frequency domain, i.e. an integer number. This means that there is an unassigned complementary resource, such as outlined with reference to FIGS. 5A and B. However, once there is sufficient unassigned resource in the combined complementary parts of two or more subframes, a repetition is mapped in that resource in the frequency and time domains, as shown in FIG. 7.

The particular example of FIG. 7 shows how REP0 is mapped to the first 16 PRBs of the first subframe. Since there are only 8 PRBs left in the first subframe, it is not possible to map an entire repetition to these 8 PRBs. REP1 is therefore mapped to the second subframe. However, in the first and second subframes there are now a total of 16 unassigned PRBs, so the REP2 is mapped to these resources, spanning two subframes. The mapping may carry on in the same manner for any subsequent transmissions.

Figure 8:
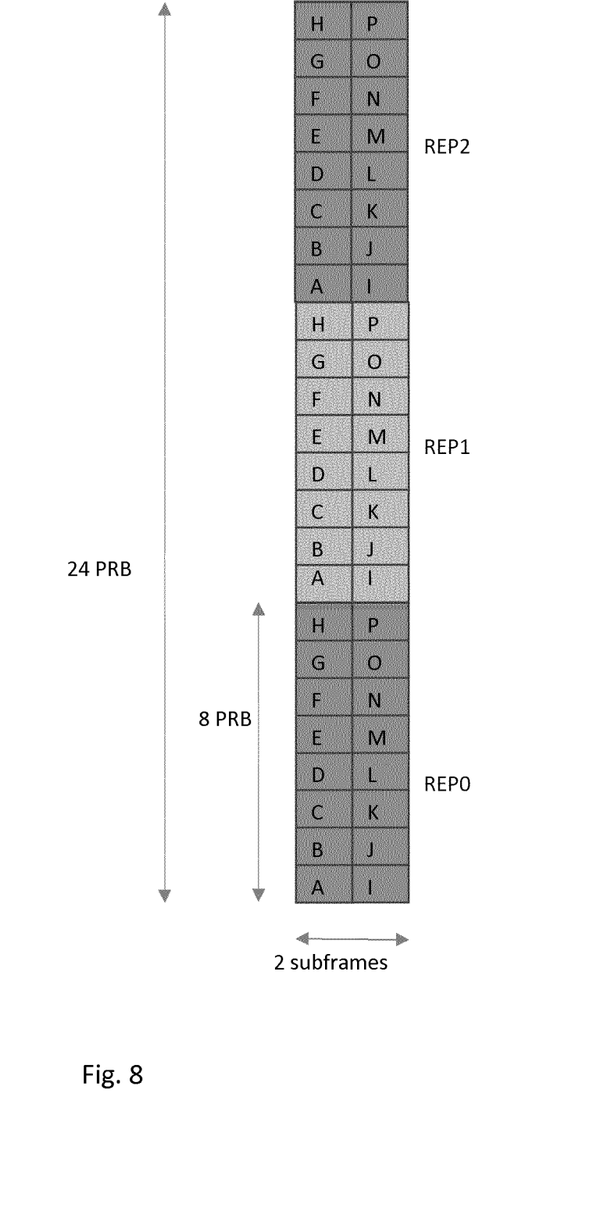
FIG. 8 illustrates an embodiment of scheduling where a number of resource units to be assigned to one repetitive transmission in one timeslot is calculated and then repeated in another timeslot if there are not sufficient available resources in the first timeslot.

FIG. 8 shows an example of another embodiment. In this mapping, repetitions are mapped to the greatest common divisor (GCD) of the bandwidth allocated to the UE and the number of PRBs allocated per repetition. Transmission of a block of physical data allocated to N radio resource units, in a resource bandwidth of M radio resource units, is in this embodiment scheduled to a subset S of the resource bandwidth in consecutive time slots, wherein S is the greatest common divisor of N and M. In the shown example, a bandwidth of M=24 PRBs are allocated to the UE, and N=16 PRBs are allocated per repetition. Then S=GCD(24,16)=8. The predetermined mapping of repetitions thus prescribes that one transmission of a block of data shall be assigned to the physical resources as shown in FIG. 8, where each repetitive transmission is scheduled to be mapped onto 8 PRBs per subframe, whereby two subframes are used to assign the full number of PRBs per repetitive transmission. Note that in this embodiment, a fourth repetition could be completely mapped in frequency order in a third subframe. The figure applies labels "A", "B", "C" etc to the PRBs within a repetition. A benefit of this embodiment is that repetitions are equally distributed in both frequency and time. Another benefit of this method is that symbol combining can be achieved for REP0, REP1 and REP3 since they occupied the same frequency resource in each subframe.

Referring again to FIG. 6 or FIG. 7, note that there may be some unassigned resource when the predetermined frequency repetition mapping is applied (e.g. the white squares shown in FIG. 7). Since both the UE and the eNB know that these resources are unassigned to the UE, they can be assigned to another UE.

In an alternative embodiment (not shown), a further partial repetition can be sent in the otherwise unassigned resources. The partial repetition may consist of only some of the PRBs of a whole repetition. Preferably, the partial repetition may be configured to occupy the entire range of PRBs that is not assigned to an integer number of full repetitions. For example, in FIG. 7, a full repetition occupies 16 PRBs. The white boxed area may be used by transmitting a fourth partial repetition. This fourth partial repetition consists of the first 8 PRBs of a full repetition (which occupies 16 PRBs). The partial repetition can be formed by mapping a transport block to the full 16 PRB physical allocation and puncturing the final 8 PRBs of this allocation.

As already noted, the network preferably dynamically signals to the UE, e.g. via DCI, to utilize frequency domain repetition. A new field in the DCI can be used to indicate whether the UE uses frequency domain repetition. In an embodiment, said new field is a 1 bit field to indicate whether the UE should perform frequency domain repetition. If the bit indicates that frequency domain repetition is enabled, the UE would map its repetition in the frequency domain according to a predetermined frequency repetition mapping. The predetermined frequency repetition mapping can be configured by the network via higher layer signaling or be predefined in the specifications. In another example, the DCI can contain a field that selects one of a plurality of predetermined frequency repetition mappings.

In one embodiment, the predetermined frequency repetition mapping may be configured to maximize the use of resources in the frequency domain by filling them completely with repetitive transmission of data. An example of such a mapping function is shown in FIG. 6, where the base station maps the PRBs carrying the block of data in the frequency domain first followed by the time domain. Here, if there are insufficient PRBs to map an entire block of data, the remaining PRBs of that block are mapped in another subframe, e.g. the subsequent subframe or another subframe. In another embodiment, the predetermined frequency repetition mapping may be configured to maps an integer number of repetitive transmissions of a block of data within one subframe, as in FIG. 5A or 5B. For example, the number of repetitions $R_{TB}$ of a block of data, here also called Transport Block (TB), in a subframe in the frequency domain can be determined using the floor function as follows:

$$R_{TB} = \lfloor N_{PRB}/N_{TB} \rfloor$$

where, $N_{PRB}$ is the number of PRB in the narrowband (e.g. 6 PRBs or 24 PRBs) and $N_{TB}$ is the number of PRBs used to carry the TB.

In one embodiment, the mentioned new field may also indicate the number of PRBs within a narrowband used for frequency domain repetition. For example, the allocated block of data may consume 2 PRBs while the UE has received the indication that that the available resource bandwidth is 6 PRBs, this means that the UE should repeat 3 times (6/2) in the frequency domain.

Many of the examples provided herein are based on the concept of adding a 24 PRB option to a legacy 6 PRB solution. However, note that this method could be applied also in more generic terms for using the frequency domain repetition concept to a transmission using a wider bandwidth capable transmitter. A legacy UE with 20 MHz bandwidth could e.g. apply this method for frequency domain repetition when using coverage enhancement mode, and in its implementation apply more than 24 PRBs.

Various embodiments have been described by way of examples, setting out numerous ways of realizing ways of putting the invention into practice, which invention is limited only by the appended claims. As will be evident to the person skilled in the art, the invention primarily relates to embodiments for employing repetitive transmission in the downlink, according to a predetermined mapping of repetitions. However, it will be equally evident to the skilled reader that, even when is determined in the network that predetermined mapping of repetitions will be employed, such predetermined mapping may alternatively or additionally be applied to repetitions in the uplink.

The invention claimed is:

1. Method carried out in a radio communications network for communicating with a user equipment having a resource bandwidth, comprising
transmitting resource allocation information addressed to the user equipment,
wherein said resource allocation information comprises an indication of frequency domain repetition,
wherein said frequency domain repetition is associated with a predetermined mapping of repetitions involving scheduled repetitive transmission of physical data within radio resource units at different frequencies of a common subframe within said resource bandwidth, wherein
an integer number of repetitive transmissions of a whole block of physical data, and a first portion of one further transmission of the block of physical data, is scheduled within a first subframe over the full frequency range of the resource bandwidth, and
a second portion of the further transmission of the block of physical data is scheduled within a second subframe.

2. The method of claim 1, wherein an indication of said predetermined mapping of repetitions is transmitted with said resource allocation information.

3. The method of claim 1, wherein an indication of said predetermined mapping of repetitions is transmitted with higher layer signaling than said resource allocation information.

4. The method of claim 1, wherein said predetermined mapping of repetitions is specified as a rule associated with frequency domain repetition.

5. The method of claim 1, wherein said indication of frequency domain repetition includes a one bit field representing a true or false value for allowing communication with frequency domain repetition.

6. The method of claim 1, wherein said repetitive transmission is scheduled based on an indication of radio resource units allocated for transmitting a block of physical data.

7. The method of claim 1, wherein an integer number of repetitive transmissions of a whole block of physical data, mapped to a first number of radio resource units, is scheduled within each of one or more subframes.

8. The method of claim 1, wherein said integer number of repetitive transmissions occupy a majority of the frequency range of the resource bandwidth, and where a complementary range of the resource bandwidth contains a second number of radio resource units, wherein said second number is smaller than said first number.

9. The method of claim 1, wherein said resource bandwidth ranges from a first end, comprising a base radio resource unit, to a second end, comprising a top radio resource unit, wherein repetitive transmissions of physical data are first scheduled in a radio resource unit order throughout said resource bandwidth and secondly in consecutive subframe order.

10. The method of claim 9, wherein one transmission of a block of physical data divided over two consecutive subframes has a first portion scheduled within a first subframe including the top resource unit, and a second portion within a second subframe including the base resource unit.

11. The method of claim 8, wherein transmission of one whole block is divided in portions, which portions are mapped to radio resource units of said complementary range of a number of consecutive subframes.

12. The method of claim 8, wherein one repetition of transmission comprises only a portion of a whole block, which portion is mapped to radio resource units of said complementary range.

13. The method of claim 1, wherein transmission of a block of physical data allocated to N radio resource units, in a resource bandwidth of M radio resource units, is scheduled to a subset S of the resource bandwidth, wherein S is the greatest common divisor of N and M, in consecutive subframes.

14. The method of claim 1, wherein said integer number of transmissions is 1.

15. The method of claim 1, wherein said radio resource unit is a physical resource block PRB, or narrowbands containing a number of resource blocks, of an LTE system.

16. The method of claim 7, wherein said predetermined mapping of repetitions involves repeated transmission of one transport blocks in two or more consecutive subframes.

17. The method of claim 1, wherein said indication of frequency domain repetition is transmitted as downlink control information DCI.

18. Network device for allocating and scheduling of radio resources for communication with a user equipment, comprising
a processor; and
a computer readable storage medium storing programming for execution by the processor, the programming including instructions to carry out the steps of:
transmitting resource allocation information addressed to the user equipment,
wherein said resource allocation information comprises an indication of frequency domain repetition,
wherein said frequency domain repetition is associated with a predetermined mapping of repetitions involving scheduled repetitive transmission of physical data within radio resource units at different frequencies of a common subframe within said resource bandwidth, wherein
an integer number of repetitive transmissions of a whole block of physical data, and a first portion of one further transmission of the block of physical data, is scheduled within a first subframe over the full frequency range of the resource bandwidth, and
a second portion of the further transmission of the block of physical data is scheduled within a second subframe.

19. User equipment configured for radio communication with a radio communications network, comprising
a radio receiver for receiving allocation and scheduling information from the radio network;
a processor; and
a computer readable storage medium storing programming for execution by the processor, the programming including instructions which, when executed, configure the radio receiver to retrieve data received in repeated transmissions from the radio network, in which a block of physical data is repeated in the frequency domain wherein said frequency domain repetition is associated with a predetermined mapping of repetitions involving scheduled repetitive transmission of physical data within radio resource units at different frequencies of a common subframe within said resource bandwidth, wherein the radio receiver is configured to retrieve
an integer number of repetitive transmissions of a whole block of physical data, and a first portion of one further transmission of the block of physical data, scheduled within a first subframe over the full frequency range of the resource bandwidth, and
a second portion of the further transmission of the block of physical data scheduled within a second subframe.

20. The method of claim 1, wherein said integer number of transmissions is 2 or more.

\* \* \* \* \*